United States Patent
Broecker et al.

(10) Patent No.: US 9,592,736 B2
(45) Date of Patent: Mar. 14, 2017

(54) CONTROLLING A LOCKING DEVICE OF AN ELECTRIC CHARGING PORT

(71) Applicant: Volkswagen Aktiengesellschaft, Wolfsburg (DE)

(72) Inventors: Marco Broecker, Berlin (DE); Lutz Dornburg, Falkensee (DE); Robert Konnopka, Berlin (DE); Linda Kroj, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 181 days.

(21) Appl. No.: 14/713,782

(22) Filed: May 15, 2015

(65) Prior Publication Data
US 2015/0329002 A1    Nov. 19, 2015

(30) Foreign Application Priority Data
May 15, 2014  (DE) .................... 10 2014 209 210

(51) Int. Cl.
*H02J 7/00* (2006.01)
*B60L 3/00* (2006.01)
(Continued)

(52) U.S. Cl.
CPC ............ *B60L 3/00* (2013.01); *B60L 11/1818* (2013.01); *B60L 11/1838* (2013.01); *B60L 11/1846* (2013.01); *H02J 7/00* (2013.01); *H02J 7/0047* (2013.01); *H02J 2007/0049* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .... H02J 7/00; H02J 7/0047; H02J 2007/0049; B60L 3/00; B60L 11/1818; B60L 11/1838; B60L 11/1846; Y02T 10/7005; Y02T 10/7072; Y02T 90/121; Y02T 90/128; Y02T 90/14; Y02T 90/163; Y02T 90/169; Y04S 30/14
USPC .................................................. 320/109, 104
See application file for complete search history.

(56) References Cited

U.S. PATENT DOCUMENTS

| 6,310,464 | B1 | 10/2001 | Koo | |
|---|---|---|---|---|
| 6,945,803 | B2 * | 9/2005 | Potega | G01K 1/02 374/E1.002 |

(Continued)

FOREIGN PATENT DOCUMENTS

| CN | 102781715 A | 11/2012 |
|---|---|---|
| DE | 199 59 430 A1 | 1/2001 |

(Continued)

*Primary Examiner* — Phallaka Kik
(74) *Attorney, Agent, or Firm* — Muncy, Geissler, Olds & Lowe, P.C.

(57) ABSTRACT

A method for controlling a locking device of an electric charging port of a vehicle. The vehicle has a keyless entry system, which makes it possible for the vehicle to be unlocked without the active operation of a vehicle key. Presence information of the vehicle key in the vicinity of the vehicle is detected and further a state of charge is detected that indicates whether a charging process is currently taking place via the charging port. The locking device is activated depending on the presence information and the state of charge.

10 Claims, 2 Drawing Sheets

(51) Int. Cl.
  *B60L 11/00*    (2006.01)
  *B60L 11/18*    (2006.01)

(56) References Cited

U.S. PATENT DOCUMENTS

| | | | |
|---|---|---|---|
| 7,950,943 B2 | 5/2011 | Ohtomo | |
| 8,311,690 B2 | 11/2012 | Tanaka | |
| 2009/0082916 A1 | 3/2009 | Tanaka | |
| 2011/0106329 A1* | 5/2011 | Donnelly | B60L 3/12 700/291 |
| 2013/0204473 A1 | 8/2013 | Then et al. | |
| 2013/0255333 A1 | 10/2013 | Kurunizawa et al. | |
| 2014/0159857 A1* | 6/2014 | Ieda | G07C 9/00309 340/5.6 |
| 2014/0167695 A1* | 6/2014 | Shimizu | H01R 13/6275 320/109 |
| 2014/0167915 A1* | 6/2014 | Tamada | G07C 9/00309 340/5.61 |
| 2014/0170879 A1* | 6/2014 | Kahara | B60L 1/003 439/304 |
| 2014/0371962 A1* | 12/2014 | Smith | B60L 11/1824 701/22 |

FOREIGN PATENT DOCUMENTS

| | | |
|---|---|---|
| DE | 10 2008 048 310 A1 | 4/2009 |
| DE | 10 2009 021 720 A1 | 11/2009 |
| DE | 10 2011 000 094 A1 | 7/2012 |
| JP | 2010-264847 A | 11/2010 |

\* cited by examiner

CONTROLLING A LOCKING DEVICE OF AN ELECTRIC CHARGING PORT

This nonprovisional application claims priority under 35 U.S.C. §119(a) to German Patent Application No. 10 2014 209 210.8, which was filed in Germany on May 15, 2014, and which is herein incorporated by reference.

BACKGROUND OF THE INVENTION

Field of the Invention

The present invention relates to methods for controlling a locking device of an electric charging port of a vehicle, particularly a locking device of a vehicle with a so-called keyless entry system, i.e., a vehicle with an entry system that enables unlocking of the vehicle without the active operation of a vehicle key. The present invention relates further to control devices that use the methods for controlling the locking device.

Description of the Background Art

Vehicles such as, e.g., electric vehicles or hybrid electric vehicles, which have at least one electric motor as the propulsion source, typically have a built-in electrical energy storage device, for example, a rechargeable battery, which provides the electric power for operating the electric drive motor. An electric vehicle in particular can be provided, moreover, with a charging port by which the energy storage device can be charged. For example, the charging port can be coupled to an external power supply via a charging cable. The charging port typically has a locking device which in the locked state prevents the charging cable coupled to the charging port from being disconnected from the charging port. The locking device for the charging port can assure, for example, that the connection between the charging cable and the charging port can be disconnected only when no charging current is presently flowing across the charging port, for example, to protect the electrical contacts of the charging port and to provide personal protection. Further, the locking device can prevent a charging process from being interrupted unintentionally or by an unauthorized person by disconnection of the charging cable from the charging port.

In this regard, DE 10 2009 021 720 A1, which corresponds to U.S. Pat. No. 7,950,943, discloses a control device for an electric vehicle with a storage device that is charged by an external power supply. A power supplying connector on the external power supply is connected to a power receiving connector of the vehicle while the storage device is being charged. The control device comprises a door locking determining device for determining a locked state of a vehicle door, a connector locking mechanism, which is provided on the vehicle and can be switched between a blocked and a released state, and a connector locking control device for switching the connector locking mechanism to the blocked state when the door is in a locked state. The connector locking control device switches the connector locking mechanism to the released state when the door is in an unlocked state.

So-called keyless entry systems are being used increasingly in vehicles. In such a system, a user of the vehicle carries only one electronic device, for example, a transponder, and the vehicle detects the presence of the electronic device and opens, for example, the doors of the vehicle or releases the starting of the vehicle, without the user actively operating the electronic device that corresponds to a vehicle key. The doors of the vehicle are, for example, locked automatically when the user leaves the vehicle. In electric vehicles, the locking device of the electric charging port is usually not integrated into the keyless entry system, because the charging process and thus the locking should already have occurred while the driver is still in the vehicle's vicinity and because the charging process should not be interrupted unnecessarily when the driver approaches his vehicle, for example, to place a purchase in the vehicle without then driving the vehicle. The locking device of the electric charging port is therefore usually controlled by corresponding control elements in the vehicle or over a wireless remote control on the vehicle key or the electronic entry device by active operation by the user. This is inconsistent with the concept of a keyless entry system, however.

SUMMARY OF THE INVENTION

It is therefore an object of the present invention to provide a locking device of an electric charging port of an electric vehicle without the active operation of a vehicle key or a comparable electronic device by the user.

According to an embodiment of the present invention, a method is provided for controlling a locking device of an electric charging port of a vehicle, particularly an electric vehicle. The vehicle comprises an entry system to unlock the vehicle without the active operation of a vehicle key. In other words, the vehicle comprises a keyless entry system, in which the vehicle is automatically locked and/or unlocked depending on the presence or absence of an electronic device, for example, a transponder, which represents the vehicle key. In the method, presence information of the electronic device or of the vehicle key in the vehicle's vicinity is detected and further a state of charge is detected that indicates whether a charging process is currently taking place via the charging port. The locking device is activated depending on the presence information and the state of charge. For example, the locking device can be automatically unlocked, when a charging process is not currently taking place and the vehicle key is in the vehicle's vicinity. As a result, a convenient unplugging of a charge plug from the charging port can be made possible, when no charging process is occurring, and simultaneously the removal of the charge plug from the charging port can be prevented when a charging process is occurring or an unauthorized person who does not have the vehicle key attempts to pull the charge plug out of the charging port.

According to an embodiment, the state of charge can indicate that no charging process is currently taking place via the charging port, when a vehicle traction battery that is chargeable via the charging port is fully charged, i.e., when the traction battery cannot be charged further. Alternatively or in addition, the state of charge can indicate that no charging process is currently taking place via the charging port, when charging of the traction battery was stopped in error or when charging of the traction battery was stopped by input from a user of the vehicle. The input from the vehicle's user can have been transmitted to the vehicle, for example, via a mobile online service from an electronic device of the user, for example, a mobile telephone, particularly a smartphone. Alternatively or in addition, the state of charge can indicate that no charging process is currently taking place via the charging port, when charging of the traction battery is to start at a later time by means of time control. The charging of the traction battery can occur via time control, a so-called timer operation, in order to be able to utilize, for example, favorable electricity rates at certain times during the day for charging the traction battery. During pauses in charging or during a time period up to a start of the charging process, the state of charge therefore indicates that no charging process is currently taking place via the charging port, so that optionally the locking device of the charging port can be automatically unlocked when an authorized user removes the charging cable from the charging port. Finally, alternatively or in addition, the state of charge can indicate that no charging process is currently taking place via the charging port, when the traction battery has a predetermined state of charge and the traction battery should not be currently charged beyond this state of charge. For example, the user can have predetermined via a timer setting or some other setting how fully the battery is to be charged. For example, the user can have set that the battery is to be charged, for example, up to 80% at a specific time. When the desired state of charge of 80% is achieved, the charging process is stopped and this is indicated accordingly by the state of charge.

In an embodiment, the presence information of the vehicle key can be detected by determining whether a wireless connection can be established between the vehicle key, particularly a transponder, and a transmitting/receiving device of the vehicle. If the wireless connection can be established, the presence information indicates the user's presence, whereas the presence information indicates the user's absence if the wireless connection cannot be established. Thus, the locking device can be unlocked, e.g., automatically when the user is within a sufficient proximity to the vehicle and there is an appropriate state of charge.

In an embodiment, the presence information of the vehicle key can be detected in that position information of the vehicle key in relation to the charging port is determined. It can be determined thereby, for example, whether the user of the vehicle who carries the vehicle key is located within a specific distance to the charging port. The charging port in this case can be unlocked automatically, for example, only when the user is located within a specific distance to the charging port.

Alternatively or in addition, to detect the presence information of the vehicle key, movement information of the vehicle key in relation to the charging port can be determined. For example, it can be determined whether the vehicle key is moving toward or away from the charging port. Accordingly, the locking device can lock or unlock the charging port.

According to an embodiment, the locking device can be activated in such a way that it unlocks the charging port when it is determined that a wireless connection can be established between the vehicle key and the transmitting/receiving device of the vehicle and no charging process is currently taking place. In other words, the charging port is automatically unlocked when no charging current flows across the charging port and a user with the vehicle key is located within the wireless range of the vehicle. The charging port is thereby unlocked when a user with the transponder is detected and the vehicle is not charging, can no longer be charged, or is not to be charged further.

According to an embodiment, the locking device can be activated to unlock the charging port, when no charging process is currently taking place and in addition the movement information indicates movement of the vehicle key in the direction toward the charging port or the position information indicates a position of the vehicle key within a specific distance to the charging port. Movement of the vehicle key in the direction toward the charging port or away from the charging port, as well as, for example, a distance to the charging port, can be determined with the aid of, for example, a plurality of transmitting/receiving antennas of the vehicle entry system on the vehicle or with the aid of a transmitting/receiving antenna of the entry system in the immediate vicinity to the charging port. This information can be used, for example, to assess whether the user in fact would or would not like to remove the charge plug from the charging port. If a user, for example, would only like to place something in the vehicle or would like to remove something from the vehicle, he will approach a door or the trunk of the vehicle and not the charging port. In this case, for example, an unnecessary unlocking of the charging port can be prevented.

In an embodiment, the locking device can be activated to lock the charging port, when the locking device, as previously described, has unlocked the charging port depending on the presence information and the state of charge and the charge plug is plugged into the charging port and it was determined in addition that no wireless connection can be established between the vehicle key and a transmitting/receiving device of the vehicle. In other words, the charge plug is automatically locked, when no user with a vehicle key is detected in the vicinity of the vehicle and the charge plug is plugged in but only when previously an unlocking of the charge plug was requested based on the keyless entry system. If, therefore, for example, a user of the vehicle has entered the vicinity of the vehicle, as a result of which the charging port was unlocked, but then the user has again moved away from the vehicle without removing the charge plug, the charging port is automatically locked again so that, for example, a timer-controlled charging process can be continued.

In an embodiment, the locking device can be activated to lock the charging port, when the locking device was previously activated to unlock the charging port depending on the presence information and the state of charge, and when a charge plug is plugged into the charging port and then in addition the movement information indicates movement of the vehicle key in the direction away from the charging port. Alternatively or in addition, the locking device can be activated to lock the charging port, when the locking device was previously activated to unlock the charging port depending on the presence information and the state of charge, and a charge plug is plugged into the charging port and the position information indicates a position of the vehicle key outside a specific distance to the charging port. In other words, the charge plug is locked when the user's movement profile indicates movement away from the charging port or a specific minimum distance to the charging port, for example, at least 1 meter, and a charge plug is plugged in but only when previously an unlocking of the charge plug was requested by the keyless entry system. When the user with the vehicle key therefore moves in the direction of the charging port or is less than a specific distance of, for example, 1 meter away from the charging port and thereby the charging port was unlocked, this charging port is again locked automatically when the user does not remove the charge plug and moves away from the charging port. In this case, for example, a planned timer charging can be carried out at a later time by the automatic locking of the charging port.

According to an embodiment, furthermore, a control device is provided for controlling a locking device of an electric charging port of a vehicle. The vehicle comprises an entry system, particularly a so-called keyless entry system, which makes it possible to unlock the vehicle without a user actively operating a vehicle key. In fact, the keyless entry system makes it possible that the vehicle is automatically unlocked, when a user of the vehicle together with the vehicle key approaches the vehicle. The control device comprises a detector for detecting the presence of the vehicle key in the vicinity of the vehicle and for detecting a state of charge that indicates whether a charging process is or is not currently taking place via the charging port. The control device comprises further a processor for example, an electronic control device for a microprocessor control device which is capable of activating the locking device depending on the presence information and the state of charge. The control device is suitable further particularly for carrying out the previously described method or one of its embodiments and therefore also comprises the previously described advantages.

According to an embodiment, a further method is provided for controlling a locking device of an electric charging port of a vehicle. The vehicle comprises an entry system, which makes it possible for the vehicle to be unlocked without an active operation of a vehicle key by a vehicle user, therefore, a so-called keyless entry system. In the method, presence information of the vehicle key in the vicinity of the vehicle is detected and a plugging process at the charging port is detected. The plugging process indicates that a charge plug is coupled to the charging port. In other words, information on a process is provided that indicates that the charge plug is coupled to the charging port. The plugging process information can be used, for example, as a so-called trigger signal in order to start the processing or a process in an electronic processing device. In the method, depending on the presence information and the plugging process, the charging port is locked with the aid of the locking device. In particular, the charging port can be locked when the charge plug is coupled to the charging port and the presence of the vehicle key in the vicinity of the vehicle was detected. As a result, a charging process can be started immediately when the charge plug is inserted in the charging port, also when the user together with the vehicle key is still located within the entry system detection range.

According to an embodiment, a control device is provided for controlling a locking device of an electric charging port of the vehicle, whereby the vehicle comprises an entry system in order to unlock the vehicle without the active operation of a vehicle key by the user. The control device comprises a detector for detecting presence information of the vehicle key in the vicinity of the vehicle and for detecting a plugging process which indicates that a charge plug is coupled to the charging port. The control device comprises a processor that is capable of locking the locking device depending on the presence information and the plugging process. Therefore, the control device is suitable for carrying out the previously described method and also comprises the previously described advantages.

According to an embodiment, an electric vehicle is provided with an electric power source and a charging port for charging the electric power source. The electric vehicle comprises an entry system, particularly a so-called keyless entry system, which makes it possible to unlock the electric vehicle without the active operation of a vehicle key by a vehicle user. The vehicle comprises further the previously described control device by which the charging port of the vehicle can also be unlocked and locked in a suitable manner via the keyless entry system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
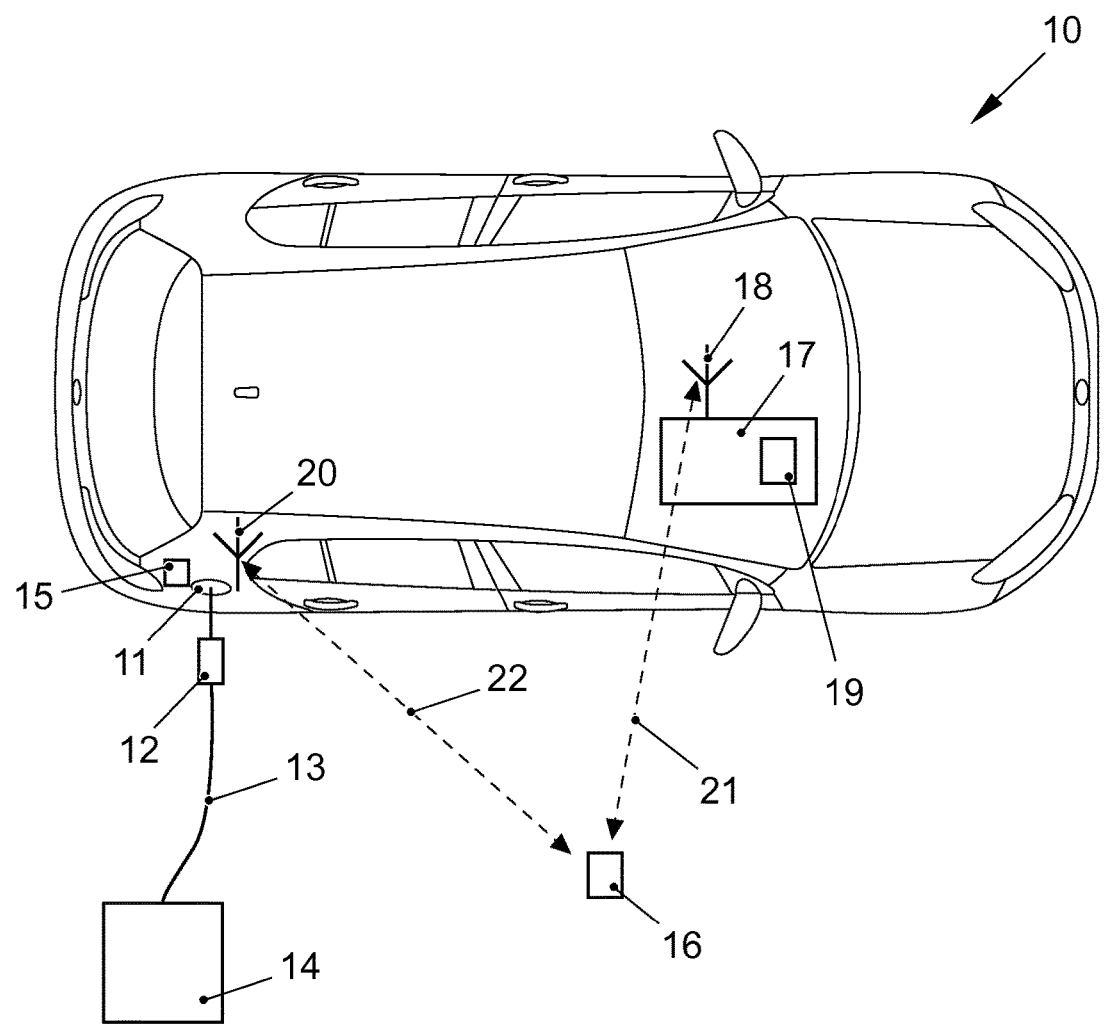
FIG. 1 shows schematically a vehicle according to an embodiment of the present invention.

FIG. 1 shows a vehicle 10, particularly an electric vehicle, with a charging port 11 in which a charge plug 12 can be inserted, which is connected via a charging cable 13 to an external charging device 14. External charging device 14 is coupled, for example, to a public power grid and provides a charging voltage suitable for charging an electric traction battery of vehicle 10 via charging cable 13 and charge plug 12. To prevent charge plug 12 from being pulled out of charging port 11 by an unauthorized person, or to prevent the charge plug 12 from being pulled out of charging port 11 while a charging current is flowing across the connection, a locking device 15 is provided in vehicle 10, which in a locked state prevents charge plug 12 from being pulled out of charging port 11, and which in an unlocked state enables the pulling of charge plug 12 out of charging port 11.

Vehicle 10 comprises further a so-called keyless entry system which makes it possible that openings of vehicle 10, for example, the doors, a trunk lid, or a tailgate of vehicle 10 can be unlocked without the active operation of a vehicle key by a user of the vehicle. In other words, it is sufficient when a vehicle user carries, for example, an electric device 16, especially a so-called transponder, and when electronic device 16 approaches the vehicle, the vehicle openings are automatically unlocked and optionally released during the startup of vehicle 10.

Electronic device 16 thus replaces a classic vehicle key. In contrast to, for example, a wireless remote control, as is often used in conjunction with a vehicle key for closing or opening a vehicle, in a keyless entry system it is not necessary to operate buttons or the like on electronic device 16, but it is sufficient for the user to carry electronic device 16, for example, in a jacket pocket or in a handbag.

The entry system comprises a control device 17, which can determine the presence of electronic device 16, for example, via an antenna 18. To this end, control device 17 can comprise, for example, a transmitting and receiving device which is coupled to antenna 18 and establishes a communications link 21 to electronic device 16 over which authentication information is transmitted. Control device 17 comprises a processor 19 that processes the authentication information and activates locking devices, for example, for the doors and the tailgate of vehicle 10 depending on the processed authentication information. Control device 17, further, can have an additional antenna 20 and a transmitting/receiving device associated with additional antenna 20, whereby additional antenna 20 is placed in the area of charging port 11 of vehicle 10. A further communications link 22 to electronic device 16 can be established via additional antenna 20. With the aid of additional antenna 20, it can be determined, for example, whether electronic device 16 is moving toward or away from charging port 11 or whether electronic device 16 is located within a predetermined distance to charging port 11. Control device 17 furthermore is coupled to locking device 15 for charging port 11 and in the case of a plugged-in charge plug 12 can activate it in order to either lock or release charge plug 12 in charging port 11. The operation of control device 17 for controlling locking device 15 will be described in detail below in conjunction with FIG. 2.

Figure 2:
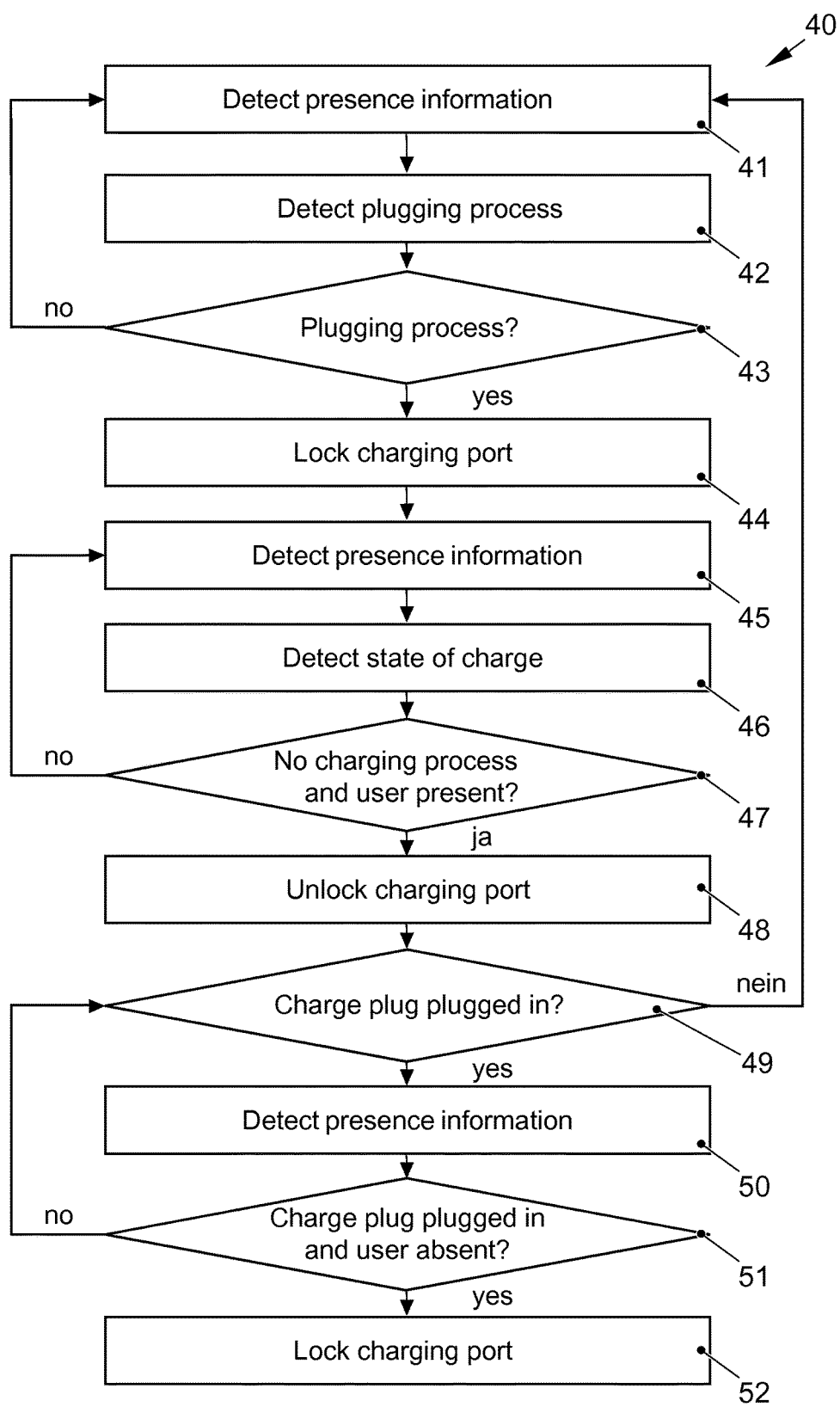
FIG. 2 shows process steps of a method according to an embodiment of the invention.

FIG. 2 shows a method 40 with process steps 41-52. The method begins in a state in which a charge plug 12 has not yet been plugged into charging port 11. In step 41, presence information is detected which indicates whether electronic device 16, which is also called a vehicle key below, is located in the vicinity of vehicle 10. Further, it is detected in step 42 whether charge plug 12 is plugged into charging port 11. If it is determined in step 43 that no plugging process has occurred, the method is continued in step 41. If, in contrast, it is determined in step 43 that charge plug 12 was plugged into charging port 11, the charging port is locked in step 44, in fact also when it was determined in step 41 that vehicle key 16 is located in the vicinity of vehicle 10. In other words, in step 44 charge plug 12 in charging port 11 is locked with the aid of locking device 15, although, for example, the doors and the tailgate of vehicle 10 still remain unlocked because of the presence of vehicle key 16 in the vicinity of vehicle 10. If the user now moves away from the vehicle and vehicle key 16 is therefore removed, for example, from the wireless range of antenna 18 or is removed from the vehicle farther than a specific minimum distance to vehicle 10, which is determined, for example, via a field strength, the doors and the tailgate of vehicle 10, for example, are automatically locked. Because in step 44 charging port 11 is locked directly after charge plug 12 is plugged in, the charging process can begin immediately; i.e., a charging current can be conducted from external charging device 14 via charging cable 13 to an electric charge storage device of vehicle 10, for example, a battery or a fuel cell.

During the charging process, presence information for vehicle key 16 is detected in step 45 by the entry system of vehicle 10 continuously or at least at periodic intervals. In addition, a state of charge of the charging process is detected in step 46. The state of charge indicates whether a charging process via charging port 11 is or is not currently taking place. The state of charge can indicate, for example, that no charging process is taking place, when the electrical energy storage device cannot be charged further, because the energy storage device is fully charged, therefore has a state of charge of 100%, or because the electrical energy storage device has reached a state of charge predetermined by the user, for example, a predetermined state of charge of 80%. Furthermore, the state of charge can indicate that no charging process is taking place when the vehicle cannot be charged further, because the vehicle has ended an active charging process due to, e.g., an error or input by the user, for example, over a mobile online service, and no restart condition for the charging process was set. Further, the state of charge can indicate that no charging process is currently taking place, when the vehicle is currently not being charged in a timer operating mode, but the charging process is to start at a later time.

In step 47, the presence information and the state of charge are evaluated. If it is determined in step 47 that no charging process is currently taking place and a user is within the range of vehicle 10, the method is continued in step 48. Otherwise, the method is continued in step 45; i.e., the presence information and state of charge continue to be detected. In step 48, charging port 11 is unlocked, because no charging process is currently taking place, and thus the user who is within the range of the vehicle is enabled to remove charge plug 12 from charging port 11. In step 49, it is now checked whether charge plug 12 is still plugged into charging port 11 or not. If charge plug 12 is no longer plugged in, the method is continued in step 41. Otherwise, i.e., charge plug 12 is still plugged into charging port 11, in step 50 presence information for vehicle key 16 is detected and it is checked in step 51 whether charge plug 12 is still plugged into charging port 11 and the user is absent, i.e., whether in the detecting of the presence information in step 50 it was determined that vehicle key 16 is not within the vicinity of vehicle 10, for example, that vehicle key 16 is outside the wireless range of antennas 18 and 20. If charge plug 12 is not plugged in or the user is present, the method is continued in step 49. If, in contrast, charge plug 12 is plugged in and the user is absent, in step 52 charging port 11 is again locked with the aid of locking device 15. It can be assured in this way that in the absence of the user no unauthorized person removes charge plug 12 from charging port 11.

During the detecting of presence information, particularly in steps 45 and 50, apart from the mere presence or absence of vehicle key 16 in the vicinity of vehicle 10, alternatively or in addition, movement information of vehicle key 16 relative to charging port 11 or position information of vehicle key 16 relative to charging port 11 can also be determined. An absence of the user can be determined, for example, if vehicle key 16 moves away from charging port 11 and/or vehicle key 16 is located outside a predetermined distance to charging port 11, for example, at a distance greater than 1 meter. Conversely, it can be determined that a user is present, if the vehicle key moves toward charging port 11 or is located within a specific distance of, for example, 1 meter to charging port 11. The position and movement information can be detected especially with the aid of additional antenna 20.

In summary, at least the following scenarios can be realized to lock or to unlock charge plug 12 in charging port 11 depending on the presence of vehicle key 16 and the charging process with the aid of control device 17.

Scenario 1: Charge plug 12 is unlocked when the user with vehicle key 16 is detected with the aid of the keyless entry system and the vehicle is not charging, can no longer be charged, or should not be charged further. The electric vehicle cannot be charged further, when the battery has reached, for example, a state of charge of 100%, when the vehicle has ended an active charging process, e.g., in error or by user input and no restart conditions are set, when the vehicle plans to start a charging process only in the future, or the vehicle battery has a state of charge predetermined by the user.

Scenario 2: Charge plug 12 is unlocked when the user's movement profile, detected from the movement of vehicle key 16, indicates movement in the direction toward charging port 11, the distance of the vehicle key to charging port 11 is less than 1 meter, and the vehicle is not charging, can no longer be charged, or should not be charged further.

Scenario 3: Charge plug 12 is locked, although the keyless entry system has detected the user with vehicle key 16, when charge plug 12 is plugged in; i.e., no charge plug 12 was plugged in previously or a previously plugged-in charge plug was completely removed. In other words, the charge plug is locked when charge plug 12 is removed and plugged in again or previously no charge plug 12 was plugged in and charge plug 12 is plugged in. Both result in immediate locking, so that immediate charging can be started.

Scenario 4: Charge plug 12 is locked when no user or no vehicle key 16 is detected in the vicinity of vehicle 10 and charge plug 12 is plugged in, but only when an unlocking of charge plug 12 was previously requested on the basis of the keyless entry system.

Scenario 5: Charge plug 12 is locked when the user's movement profile, detected, for example, from the movement of vehicle key 16, indicates movement away from charging port 11 and charge plug 12 is plugged in, but only when an unlocking of charge plug 12 was previously requested on the basis of the keyless entry system. Further, charge plug 12 can be locked, when the distance between vehicle key 16 and charging port 11 is less than 1 meter and charge plug 12 is plugged in, but only when an unlocking of charge plug 12 was previously requested on the basis of the keyless entry system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a locking device of an electric charging port of a vehicle, the vehicle comprising an entry system to unlock the vehicle without an active operation of a vehicle key, the method comprising:
   detecting presence information of the vehicle key in a vicinity of the vehicle;
   detecting a state of charge that indicates whether a charging process is currently taking place via the charging port; and
   activating the locking device depending on the presence information and state of charge.

2. The method according to claim 1, wherein the state of charge indicates that no charging process is currently taking place via the charging port when:
   a traction battery of the vehicle that is chargeable via the charging port is fully charged; and/or
   charging of the traction battery was stopped in error; and/or
   charging of the traction battery was stopped by an input from a user of the vehicle; and/or
   charging of the traction battery is to start at a later time via time control; and/or
   the traction battery has a predetermined state of charge beyond which the traction battery should not be charged currently.

3. The method according to claim 1, wherein the detecting of the presence information of the vehicle key comprises:
   determining whether a wireless connection is establishable between the vehicle key and a transmitting/receiving device of the vehicle;
   determining position information of the vehicle key in relation to the charging port; and/or
   determining movement information of the vehicle key in relation to the charging port.

4. The method according to claim 3, wherein the locking device is activated to unlock the charging port when it is determined that a wireless connection is established between the vehicle key and the transmitting/receiving device of the vehicle and no charging process is currently taking place.

5. The method according to claim 3, wherein the locking device is activated to unlock the charging port when no charging process is currently taking place and the movement information indicates movement of the vehicle key in a direction toward the charging port, and/or the position information indicates a position of the vehicle key within a specific distance to the charging port.

6. The method according to claim 3, wherein the locking device is activated to lock the charging port, when the locking device was previously activated to unlock the charging port depending on the presence information and the state of charge, and a charge plug is plugged into the charging port and is determined that no wireless connection is establishable between the vehicle key and a transmitting/receiving device of the vehicle.

7. The method according to claim 3, wherein the locking device is activated to lock the charging port, when the locking device was previously activated to unlock the charging port depending on the presence information and the state of charge, and a charge plug is plugged into the charging port, and the movement information indicates movement of the vehicle key in the direction away from the charging port and/or the position information indicates a position of the vehicle key outside a specific distance to the charging port.

8. A control device for controlling a locking device of an electric charging port of a vehicle, the vehicle comprises an entry system to unlock the vehicle without active operation of a vehicle key, the control device comprising:
   a detector detecting presence information of the vehicle key in a vicinity of the vehicle and detecting a state of charge that indicates whether a charging process is currently taking place via the charging port; and
   a processor activating the locking device depending on the presence information and state of charge.

9. A method for controlling a locking device of an electric charging port of a vehicle, the vehicle comprising an entry system to unlock the vehicle without active operation of a vehicle key, the method comprising:
   detecting presence information of the vehicle key in a vicinity of the vehicle;
   detecting a plugging process at the charging port, the plugging process indicating that a charge plug is coupled to the charging port; and
   locking the charging port via the locking device depending on the presence information and the plugging process.

10. A control device for controlling a locking device of an electric charging port of a vehicle, the vehicle comprising an entry system to unlock the vehicle without active operation of a vehicle key, the control device comprising:
    a detector detecting presence information of the vehicle key in a vicinity of the vehicle and detecting a plugging process that indicates that a charge plug is coupled to the charging port; and
    a processor designed to lock the locking device depending on the presence information and the plugging process.

* * * * *